United States Patent [19]

Shirley

[11] 4,245,172
[45] Jan. 13, 1981

[54] TRANSDUCER FOR GENERATION AND DETECTION OF SHEAR WAVES

[75] Inventor: Donald J. Shirley, Leander, Tex.

[73] Assignee: The United States of America as represented by the Secretary of the Navy, Washington, D.C.

[21] Appl. No.: 737,759

[22] Filed: Nov. 2, 1976

[51] Int. Cl.³ .......................................... H01L 41/08
[52] U.S. Cl. .................................. 310/332; 367/157; 310/334
[58] Field of Search ........................... 340/10, 15, 17; 310/332, 331, 334; 367/157, 180

[56] References Cited

U.S. PATENT DOCUMENTS

| 2,640,165 | 5/1953 | Howatt | 310/332 |
|---|---|---|---|
| 3,054,084 | 9/1962 | Parssinen et al. | 310/331 X |
| 3,399,314 | 8/1968 | Phillips | 340/10 |
| 3,421,137 | 1/1969 | Rathbun, Jr. | 340/10 |

Primary Examiner—Theodore M. Blum
Attorney, Agent, or Firm—R. S. Sciascia; Paul S. Collignon

[57] ABSTRACT

An improved transducer for generating and detecting shear waves using piezoelectric bimorph elements. A plurality of pairs of bimorph elements are formed by rigidly attaching together two individual lengths of piezoelectric material with each dimensioned to provide a length and width substantially greater than its thickness. The plurality of bimorph pairs are mounted in a configuration such that each pair is separated by a layer of high compliance material with the electrical polarization of each piezoelectric element pointing in the same direction. Electrical potential applied simultaneously to the electrodes of the individual pairs causes the entire end face of the transducer to perform a shearing motion which will generate or detect acoustic waves in materials in contact with the face.

15 Claims, 4 Drawing Figures

U.S. Patent   Jan. 13, 1981   4,245,172
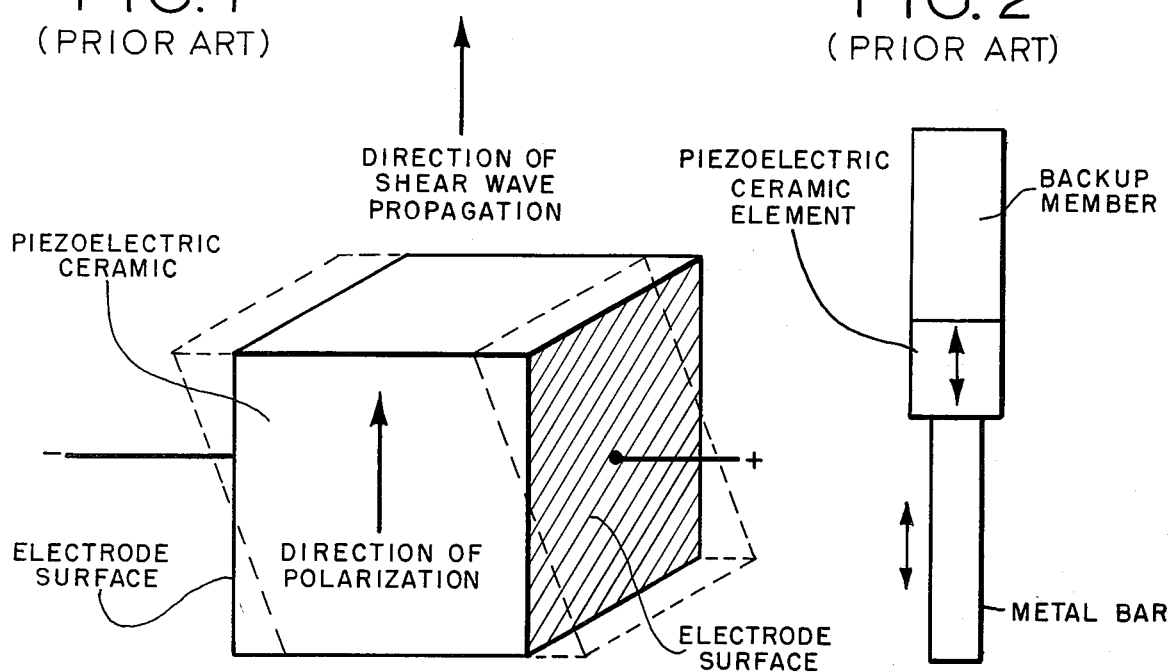
FIG. 1 (PRIOR ART)
FIG. 2 (PRIOR ART)
FIG. 3 (PRIOR ART)
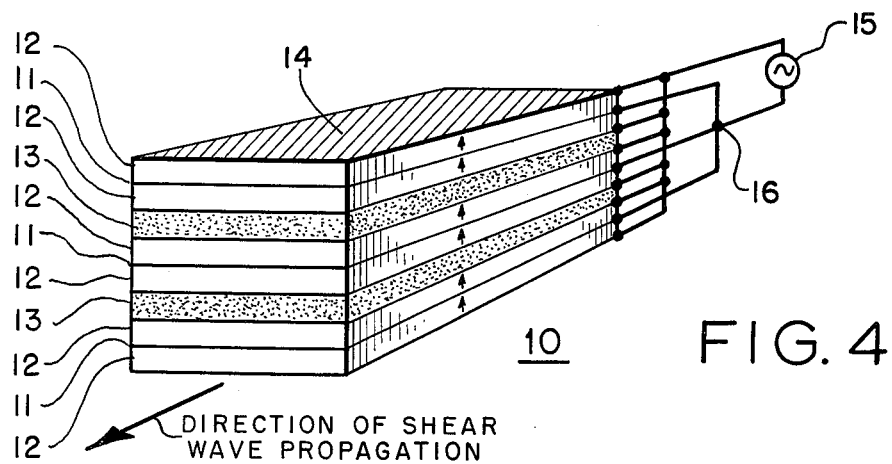
FIG. 4

TRANSDUCER FOR GENERATION AND DETECTION OF SHEAR WAVES

BACKGROUND OF THE INVENTION

The present invention relates to improved transducers for generating and detecting acoustical energy in solid and semi-solid materials and more particularly to a transducer for the improved generation and detection of shear waves.

Generally, in the study of certain materials, the characteristics of those materials and various physical parameters associated therewith can be observed and measured by an analysis of the propagation of acoustical energy therethrough. For this purpose, numerous types of transducers have been proposed to provide the most effective and efficient transfer and measurement of acoustical energy in such materials. In particular, the techniques of the prior art have employed transducers which generate acoustical energy in the form of shear waves and provide certain advantages over other types of acoustical waves in the study of material characteristics.

As is known, shear waves can be propagated in a solid material by inducing a stress in the solid perpendicular to the direction of the intended propagation. The stress is then propagated in the material with a direction of polarization coincident with the direction of the applied stress. In the prior art, such shear waves have been generated by piezoelectric transducer devices which generate movement in a piezoelectric material by the application of an electric potential thereto. When the appropriate electrical connections are made, the stress is transmitted by movement of the piezoelectric element in contact with the material in which it is desired to induce the shear wave. In such instances, a shear wave is generated in a direction perpendicular to the direction of movement of the piezoelectric surface. In still other instances, piezoelectric elements are used to move a member attached thereto. When such member is subsequently placed in contact with a material in which it is desired to induce shear waves, the waves are again generated in a manner similar to that previously described.

In order to effectively study materials using shear waves, it is important that the acoustical impedance of the transducer be closely matched to the acoustical impedance of the material under study to insure sufficient coupling of acoustical energy therebetween. Using the above-noted prior art techniques, successful coupling of the acoustical energy in the form of shear waves has been achieved when using materials exhibiting a high shear modulus. In those instances, the acoustical impedance of the shear wave transducer has been closely matched to the acoustical impedance of the material under study. However, when working with materials exhibiting a low shear modulus, problems have developed due to an impedance mismatch. In particular, the velocity of shear wave propagation in such materials is so low that the mismatch with the transducer precludes coupling of sufficient energy through the material for detection by a receiving transducer. In addition, attenuation of the shear wave is very high in the material and increases with frequency, thereby effectively preventing propagation of a shear wave over any significant distance. Consequently, the analysis of certain materials is severely restricted and any measurements made are subject to inaccuracies caused by the lack of effective energy coupling.

Accordingly, the present invention has been developed to overcome the specific shortcomings of the above-noted and similar techniques and to provide a more reliable and versatile transducer for the generation and detection of shear waves.

SUMMARY OF THE INVENTION

It is therefore an object of the present invention to provide an improved transducer for the generation of acoustical energy which is simple and inexpensive in construction and highly reliable in operation.

Another object of the invention is to provide a shear wave transducer that provides improved shear wave generation and detection in solid and semi-solid materials.

A further object of the invention is to provide a shear wave transducer which is capable of generating and detecting shear waves in materials having a low shear modulus.

Still another object of the invention is to provide a piezoelectric shear wave transducer which provides more efficient and effective coupling to materials having low acoustical impedance and high acoustical attenuation.

Yet another object of the invention is to provide a piezoelectric shear wave transducer using bimorph elements that exhibits low acoustical impedance, high sensitivity, and low resonance frequencies.

In order to accomplish the above and other objects, the invention typically utilizes a plurality of piezoelectric bimorph elements rigidly attached to form a transducer device. Each bimorph element consists of two piezoelectric plates having opposed parallel surfaces with an electrically conductive coating thereon. The plates are rigidly attached in pairs such that one of the conductive surfaces of each of the pair is electrically connected to form a common electrode therebetween. The plates are dimensioned such that the width and length significantly exceed the thickness and are oriented such that the electrical polarization of each plate points in the same direction. Each pair of plates is separated and rigidly attached by a layer of high compliance material to form a transducer having an end face thereon. The common electrode of each pair is in turn connected to one terminal of electrical source while the other electrically conductive coatings are connected to the second terminal of the same source. By applying an electrical potential from the source to the surface electrodes of the bimorph elements, an electrical field parallel to the electrical polarization of the piezoelectric material causes the elements to differentially expand and impart shearing movement to the end face of the transducer. The transducer is thus capable of inducing shear waves in materials of low acoustical impedance by the shearing motion of the end face while exhibiting high sensitivity to the detection of shear waves in the same materials.

Other objects, advantages and novel features of the invention will become apparent from the following detailed description of the invention when considered in connection with the accompanying drawings wherein:

BRIEF DESCRIPTION OF THE DRAWINGS

FIGS. 1 and 2 are schematic diagrams of shear wave transducers known in the prior art.

FIG. 3 is a schematic diagram showing a typical construction of a conventional piezoelectric ceramic bimorph element.

FIG. 4 is a schematic diagram of a shear wave transducer constructed in accordance to the teachings of the present invention.

DESCRIPTION OF A PREFERRED EMBODIMENT OF THE INVENTION

Referring now to FIG. 1, there is shown a schematic representation of a typical shear wave transducer as is commonly used in the prior art. The transducer is generally formed using a piezoelectric ceramic material having a direction of polarization parallel to two opposed planar electrode surfaces. When an electrical potential is applied to the electrode surfaces with a polarity such that the applied electric field is perpendicular to the electrical polarization of the piezoelectric material as shown in FIG. 1, a deformation of the element will result as illustrated by the dotted lines. If one of the element faces which experiences the movement caused by the noted deformation is in contact with a solid medium, a shear wave will be propagated in a direction perpendicular to the motion of the element face. By way of example, the shear wave transducer can be a piezoelectric ceramic material polarized perpendicular to the applied electric field as described above, or an AC cut quartz crystal as is well known in the prior art.

Still another type of shear wave transducer is illustrated by the construction shown in FIG. 2. Basically, this type of device includes a back-up member, a piezoelectric ceramic element rigidly affixed to the back-up member, and a metal bar rigidly attached to the piezoelectric ceramic element. When an electrical potential is applied to the ceramic element to cause movement in the direction indicated by FIG. 2, the metal bar also oscillates in the same direction. If a solid medium is in contact with the longitudinal face of the bar during such oscillation, a shear wave will be propagated in a direction perpendicular to the direction of vibration of the bar in a manner similar to the structure of FIG. 1.

As has been previously mentioned, such transducers have been relatively successful in generating shear waves in rigid materials having a high shear modulus since the acoustical impedance of the transducer is of about the same order of magnitude as the material in which the waves are induced. It was noted, however, that when attempting to use such transducers with materials exhibiting a low shear modulus (e.g. wet soils, laboratory mix sediments and ocean bottom sediments), the shear wave velocity would be so low (in the range of 1 to 2 m/sec) that the mismatch in acoustical impedance between the transmitting material and the transducer precludes the coupling of any significant amount of acoustical energy from the transducer to the material or vice versa. At the same time, the attenuation of shear waves in materials having a low shear modulus is also very high and increases with frequency thereby causing great difficulty in propagating shear waves over even very short distances (e.g. tenths of centimeters). It has therefore been observed that in order to detect or generate shear waves in materials with a low shear modulus, the transducer must have characteristics of low acoustical impedance, high sensitivity, and low resonant frequency.

In accordance with these requirements, there is known in the art a piezoelectric ceramic transducer element constructed such that its length and width are substantially greater than its thickness. The ceramic element generally has a rectangular plate configuration having two pairs of opposed parallel planar surfaces with an electrically conductive coating applied to one pair to form electrode surfaces. When the ceramic transducer is driven by an electric field applied parallel to the electrical polarization of the ceramic through the electrode surfaces, the element will exhibit a thickness deformation as well as a deformation in length, both in proportion to the magnitude of electrical potential applied thereto. When two such elements are rigidly attached to form a double thickness element with a common electrode therebetween, and the two are electrically driven 180° out of phase (i.e. as one element's length is expanded, the other's length is compressed) the combination will experience a bending force due to the differential expansion of the two components. This device is known as a bimorph transducer and is illustrated as typically constructed in FIG. 3. In the prior art, the bimorph structure has been used as a compressional wave transducer by rigidly attaching one end of the element to a diaphragm such that the motion of the element as it bends causes the diaphragm to compress the medium in contact therewith. Transducers of this type have been employed where it was necessary to have a low acoustical impedance and low frequency response (e.g. microphones) and in other areas where its characteristic of high compliance is required (e.g. phonograph pick up).

Turning now to FIG. 4, an improved transducer is illustrated for generating and detecting shear waves in accordance with the inventive technique. As shown, the device utilizes a plurality of bimorph element pairs 11 constructed from individual piezoelectric elements 12 as were shown and described with reference to FIG. 3. In the present example, the device consists of six piezoelectric plates 12 coupled to form three pairs of bimorph elements 11, which form the shear wave transducer. As was previously noted, each of the piezoelectric plates 12 is generally of an elongate rectangular configuration having two pairs of opposed parallel planar surfaces with an electrically conductive coating applied to one pair to form electrode surfaces 14. In addition, each of the piezoelectric plates 12 is dimensioned to have a length and width substantially greater than the thickness. By way of example, each piezoelectric element could be constructed with a thickness of 1/32 in., a width of ½ in., and a length of 1 in. Each of the plates is rigidly attached (e.g. by cementing or any other well known technique) to another of the piezoelectric plates such that a common electrode is formed between each of the bimorph pairs 11.

As particularly illustrated, each of the bimorph pairs 11 are rigidly connected by a substantially uniform layer of high compliance material 13 (e.g. by cementing, etc.) such that the direction of electrical polarization of each piezoelectric plate 12 is pointing in the same direction as all of the other plates 12 comprising the transducer. In this particular instance, the high compliance material can be of any well known type such as a 1/16 inch thick cork-neoprene compound, paper or cardboard or any other similar type material exhibiting the same compliant characteristics. The bimorph elements are rigidly attached with the compliant layers in such a manner as to form a generally rectangular configuration having an end face forming a plane which is substantially perpendicular to the plane forming the electrode surface. It is this planar end surface that is placed in contact with the material in which it is desired to generate or detect shear waves. The three bimorph pairs 11 are additionally connected to a source of alternating electrical potential 15 wherein one terminal of the source is connected through lines 16 to the common electrode of each of the bimorph pairs and the other terminal of the source 15 is connected to the other electrodes of the bimorph pair. The operation of the improved transducer device is now readily apparent when reference is made to FIGS. 3 and 4. When the source 15 is set to provide the proper voltage and frequency to each of the bimorph pairs 11, the resulting deformation of each pair will be as described with reference to the element of FIG. 3. The plurality of elements 11 of FIG. 4, however, will move simultaneously thereby causing the end face of the transducer to perform a shearing motion in a direction substantially parallel to the direction of polarization of the piezoelectric plates 12. By placing a material in contact with the noted end face, acoustical energy in the form of shear waves will be propagated in the material in a direction perpendicular to the planar surface of the end face of the transducer. Alternatively, the same end face can be used to detect shear waves from any material in contact therewith.

As was mentioned above, the advantages of this device over shear wave transducers known to the prior art is the comparatively low acoustical impedance exhibited by the transducer which enables the coupling of more acoustical energy between the transducer and a particular material. The result of the lowered impedance provides improved overall efficiency of the transducer to measure shear wave properties in materials exhibiting low acoustical impedance and high acoustical attenuation. These improvements are accomplished using standard piezoelectric plates connected in a common bimorph configuration enabling the construction of relatively simple and inexpensive transducer with significantly improved capabilities over those of the prior art. The same transducer provides improved sensitivity and low resonance frequency without any increase in the physical dimensions of the transducer device. All of these are advantages that have previously not been recognized or suggested by prior art devices.

While the present invention has been described with particular reference to the configuration and construction shown in FIG. 4, it is evident that the same principles can be applied to other configurations of the transducer device. For example, while each of the piezoelectric plates are electrically coupled such that the three bimorph pairs are in electrical parallel, it is likewise evident that for matching purposes or higher electrical impedance, all of the plates 12 could be electrically connected in series or any combination of series/parallel arrangement capable of providing the intended shearing movement. Such connections would be made in a manner capable of providing the proper polarity for maintaining the proper movement. In addition, while specific piezoelectric ceramic materials were mentioned, it is evident that any piezoelectric material or other similar substance, capable of exhibiting differential movement and providing low acoustical impedance in accordance with the teachings of the invention, could be used to construct a shear wave transducer exhibiting the improved properties.

Obviously, many other modifications and variations are possible in light of the above teachings. It is therefore to be understood that within the scope of the appended claims the invention may be practiced otherwise than as specifically described.

What is claimed and desired to be secured by Letters Patent is:

1. An improved transducer for generating and detecting acoustical energy propogating in materials having a low acoustical impedance comprising:
   a plurality of deformable bimorph elements, each of said elements being formed by two individual deformable members polarized in the same direction;
   high compliance means coupled to said bimorph elements for separating each of said elements, said elements being arranged such that the polarization of all of the members is oriented in the same direction; and
   means for providing electrical connections to each of said elements, said electrical connections and high compliance means being constructed and coupled to said elements in such manner as to enable the generation and detection of shear waves through said bimorph elements.

2. The transducer of claim 1 wherein each of said deformable members has a length and width substantially greater than its thickness.

3. The transducer of claim 1 wherein each of the deformable members comprises a piezoelectric material.

4. The transducer of claim 3 wherein each of the piezoelectric members has a generally rectangular plate configuration having two pairs of opposed parallel planar surfaces and wherein said means for providing electrical connections comprises an electrically conductive coating applied to one pair of the opposed planar surfaces of each piezoelectric member, to form electrode surfaces said bimorph elements being constructed by rigidly attaching pairs of the piezoelectric members along an electrode surface to form a common electrode between each pair.

5. The transducer of claim 4 wherein the polarization of each piezoelectric member is oriented in a direction perpendicular to the planar electrode surfaces and wherein the plurality of piezoelectric members are arranged to form a substantially planar end face parallel to the direction of polarization.

6. The transducer of claim 5 wherein the means for separating comprises a substantially uniform layer of high compliance material rigidly attached to the electrode surfaces of adjacent bimorph elements.

7. The transducer of claim 4 further comprising:
   a source of alternating electrical potential;
   means for coupling one terminal of said source to each of the common electrodes of said bimorph element; and
   means for coupling the other terminal of said source to each of the remaining electrode surfaces deposited on the piezoelectric members.

8. An improved apparatus for generating acoustical energy comprising:
   a transducer including,
      a plurality of deformable bimorph elements, and
      high compliance means coupled to said elements for separating each of said elements, said high compliance means being constructed and coupled to said elements to form a surface capable of providing a shearing motion; and
   means coupled to said transducer for causing the same to generate shear waves.

9. The apparatus of claim 8 wherein each of said bimorph elements comprises two individual piezoelectric members each having a length and width substantially greater than its thickness.

10. The transducer of claim 9 wherein each of the piezoelectric members has an electrical polarization oriented in the same direction as the polarization of all members in the transducer.

11. The apparatus of claim 9 wherein each of the piezoelectric members has a generally rectangular plate configuration having two pairs of opposed parallel planar surfaces and wherein said means for causing said transducer to generate shear waves comprises;
   an electrically conductive coating applied to one pair of the opposed parallel surfaces of each piezoelectric member, each bimorph element being constructed by rigidly attaching a pair of piezoelectric members along an electrode surface to form a common electrode between each pair, and
   a source of alternating electrical potential coupled to said electrode surfaces.

12. The apparatus of claim 11 wherein said source of alternating electrical potential is coupled to said transducer such that one terminal of said source is attached to each of the common electrodes of said bimorph elements and the other terminal of said source is attached to each of the remaining electrode surfaces on the piezoelectric members.

13. The apparatus of claim 9 wherein the plurality of bimorph elements are stacked to form a substantially rectangular transducer configuration having a substantially planar surface parallel to the direction of electrical polarization and perpendicular to the electrode surfaces, said planar surface forming the surface providing the shearing motion.

14. The transducer of claim 13 wherein the means for separating comprises a substantially uniform layer of high compliance material having opposed parallel planar surfaces rigidly attached to electrode surfaces of adjacent bimorph elements.

15. A method of generating shear waves comprising:
   forming a transducer having a plurality of bimorph elements each separated by a compliant material;
   placing said transducer in contact with a material in which it is desired to induce shear waves; and
   applying an electrical potential to said bimorph elements so as to cause said bimorph elements to generate a shear wave in said material.

* * * * *